United States Patent [19]

Parmar

[11] Patent Number: 4,850,599
[45] Date of Patent: Jul. 25, 1989

[54] MECHANICAL FACE SEALS

[75] Inventor: Amrat Parmar, Cambridge, England

[73] Assignee: Crane Packing Limited, England

[21] Appl. No.: 110,361

[22] Filed: Oct. 19, 1987

[30] Foreign Application Priority Data

Oct. 23, 1986 [GB] United Kingdom ................. 8625391

[51] Int. Cl.$^4$ ................................................ F16J 9/00
[52] U.S. Cl. ...................................... 277/26; 277/96.1
[58] Field of Search ................. 277/22, 26, 236, 81 R, 277/96, 96.1

[56] References Cited

U.S. PATENT DOCUMENTS

| | | | |
|---|---|---|---|
| 3,718,335 | 2/1973 | Dernedde et al. | 277/26 |
| 4,103,907 | 8/1978 | Inouye et al. | 277/96.1 |
| 4,212,475 | 7/1980 | Sedy | 277/96.1 |
| 4,261,581 | 4/1981 | Hershey | 277/26 X |
| 4,643,437 | 2/1987 | Salant et al. | 277/81 R |
| 4,659,092 | 4/1987 | Wallace et al. | 277/96 X |

FOREIGN PATENT DOCUMENTS 8423202 12/1985 Fed. Rep. of Germany .
390642 4/1965 Switzerland .
1555765 11/1979 United Kingdom .

OTHER PUBLICATIONS

Soviet Inventions Illustrated, Section Mechanical, Week 8526, Aug. 1985, Abstract No. 158042 Q 65, Derwent Publications Ltd., London, GB; & SU-A-1129 442 (As Belo Nuclear Pow) 15-12-1984.

Primary Examiner—David Werner
Attorney, Agent, or Firm—Davis, Bujold & Streck

[57] ABSTRACT

A rotary mechanical face seal includes first and second seal face members, the sealing face of one seal face member being urged into engagement with the sealing face of the other seal face member, said seal face members being such that when subjected to temperature gradients due to the generation of heat at the sealing faces, the sealing faces will remain substantially parallel in spite of any thermal distortion of the seal face members.

3 Claims, 1 Drawing Sheet

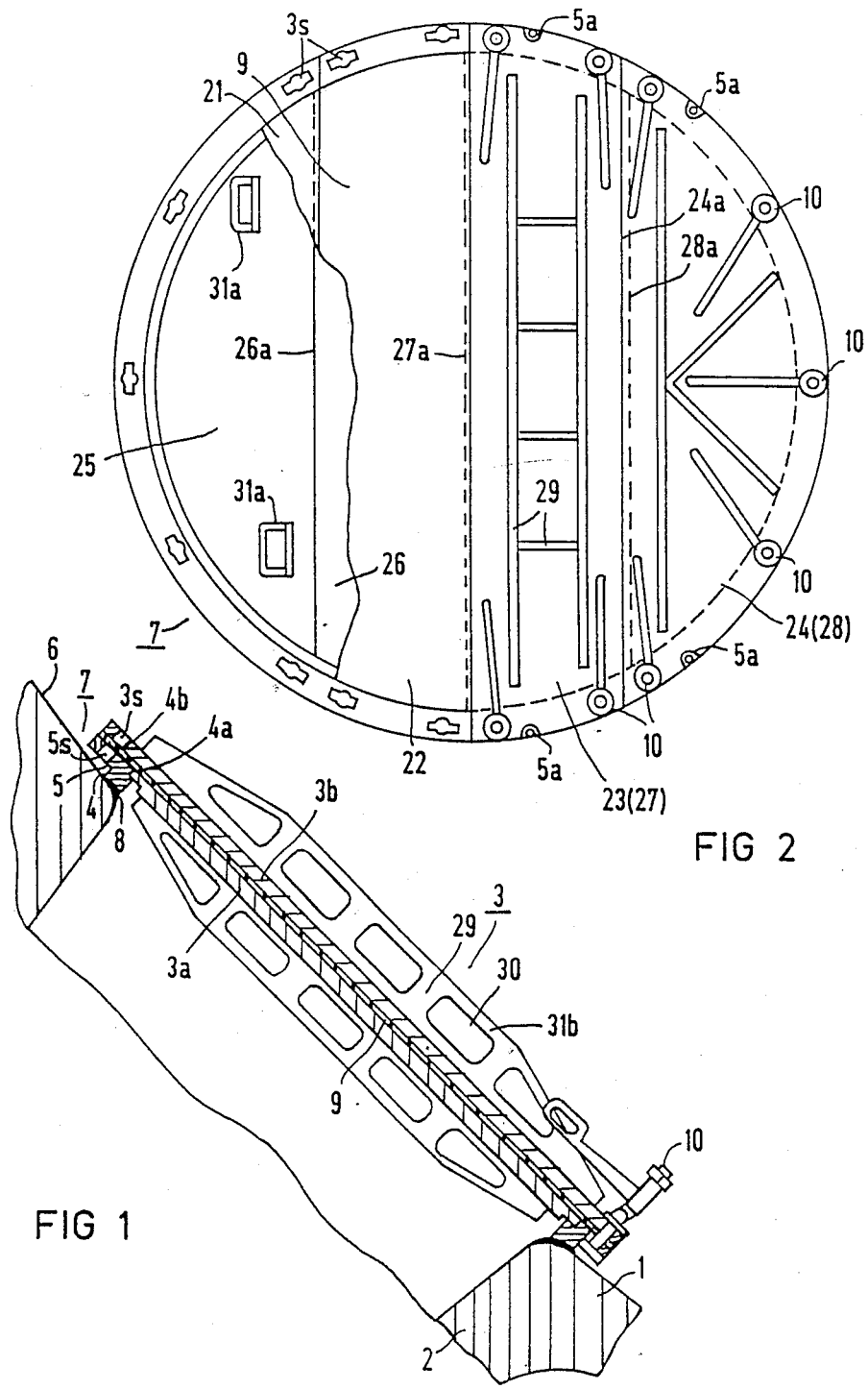

MECHANICAL FACE SEALS

BACKGROUND OF THE INVENTION

The present invention relates to mechanical face seals.

It is known to design mechanical face seals to take account of distortion of the seal face members due to the pressure differential which will be applied across them during service. Such pressure distortion controlled seals are covered by British Pat. No. 1,555,765. However, these seal face members are subject to significant temperature gradients due to heat generation at their interface and the resulting thermal distortion may be greater than pressure distortion, causing the sealing faces to rotate out of the plane in which they should be to provide acceptable sealing conditions. With conventional mechanical face seals deformation of the seal face members will cause the sealing faces of both seal face members to rotate towards the service that is the sealed fluid. Misalignment of the sealing faces is consequently the sum of rotation of the two sealing faces.

In this specification "rotation" signifies deformation of the sealing face out of the plane, usually perpendicular to the axis of rotation, in which the sealing faces are designed to engage when not subjected to temperature gradients. Positive rotations denote deformation towards the service and negative rotations denote deformations away from the service.

SUMMARY OF THE INVENTION

According to one aspect of the present invention, a rotary mechanical face seal for producing a fluid tight seal between a pair of relatively rotatable components comprises; a first seal face member fixed rotationally with respect to one of said components and a second seal face member fixed rotationally with respect to the other component, means being provided to urge opposing sealing faces of the first and second seal face members into sealing engagement, said first and/or second seal face member distorting when subjected to a temperature gradient, so that the sealing faces of the seal face members remain substantially parallel over the operational range of heat transfer coefficients to which the seal is subjected.

In accordance with the present invention both of the seal face members may be designed to exhibit substantially zero thermal rotation over the large range of heat transfer coefficients under which they are designed to operate, typically 1,000 to 10,000 W/m²K, as calculated in accordance with the definition specified in the paper "An experimental and theoretical study of pressure and thermal distortions in a mechanical seal"—ASLE Transactions, Volume 29, pages 151 to 159 by T. G. Doust and Dr. A. Parmar, 1986. However, more preferably, a pair of seal face members will be matched with regard to their thermal rotation, so as to give a substantially zero net rotation over the range of heat transfer coefficients.

BRIEF DESCRIPTION OF THE DRAWINGS

Embodiments of the invention are now described, by way of example only, with reference to the accompanying drawing, in which:

FIG. 1 shows the axial cross section of a conventional face seal member and seat;

FIG. 2 illustrates typical thermal loading conditions of the conventional seat shown in FIG. 1;

DESCRIPTION OF A PREFERRED EMBODIMENT

Figure 3:
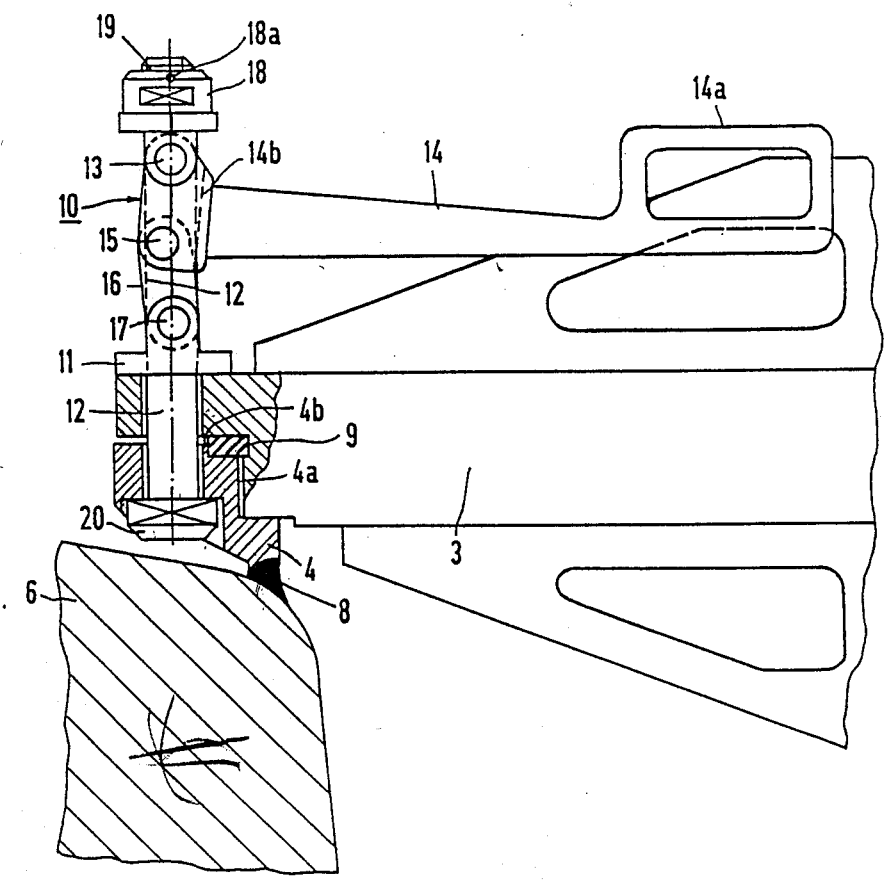
FIG. 3 shows the axial cross-section of a seat matched in accordance with the present invention with respect to the seal face member illustrated in FIG. 1 and illustrating typical thermal loading conditions.

As illustrated in FIG. 1, a seat 10 comprises a cylindrical portion 11 with outwardly directed flange portion 12 at the end defining the sealing face 13. Seal face member 14 made of carbon, has a body portion 15 of generally cylindrical configuration, with a recessed sealing face 16 and an end portion 17 with conical bore.

The seat 10 would normally be located in a correspondingly recessed portion of a housing (not shown) and would be sealed thereto. The seal face member 14 would normally be mounted on a shaft 9, a sealing wedge (not shown) engaging the surface of the shaft 9 and the conical surface of portion 17 of the seal face member 14. The sealing wedge would be urged towards the seal face member 14, to force the wedge into sealing engagement with the seal face member 14 and the shaft 9, and to urge the sealing face 16 of the seal face member 14 into sealing engagement with the sealing face 13 of seat 10.

During operation of the seal, relative rotation of the seal face member 14 and seat 10 will cause heat generation across the sealing faces 13 and 16. The seal face member 14 and seat 10 will thus be subjected to a temperature gradient and will distort so that the sealing faces 13 and 16 rotate relative to a plane normal to the shaft. The degree and direction of rotation will depend on the various dimensions of the seal face member 14 and seat 10, as well as the heat transfer coefficient under which they operate.

Typically, for a carbon seal face member 14 of the configuration shown in FIG. 1 and of nominal diameter 95 mm, at a heat transfer coefficient of 2,000 W/m²K, the thermal rotation rate of the face 16 will be +1.30 seconds/° C., the positive value indicating that rotation is towards the service that is away from the shaft 9, as indicated in FIG. 1.

The thermal rotation rate of the seat varies with the dimensions w,l,d and t. FIG. 2 illustrates the thermal loading for a conventional seat 10, showing the isothermals when the area of face 13 which engages face 16 of the seal face member 14 is at 100° C. and the heat transfer coefficient is 2000 W/m²K. As shown in FIG. 2 the average temperature of the bulk of material adjacent the sealing face 13 is higher than the average temperature of the bulk of material adjacent the axially opposite end of the seat 10. Consequently as a result of differential expansion axially across the seat 10, the sealing face 13 will rotate towards the service. A typical conventional seat 10, of nominal diameter 95 mm, for use with the seal face member 14 described above, would have dimensions W=8.3 mm; l=6.4 mm; d=4.2 mm; and t=9.3 mm. At a heat transfer coefficient of 2000 W/m²K the thermal rotation rate will be +0.8 seconds/° C.

Figure 4:
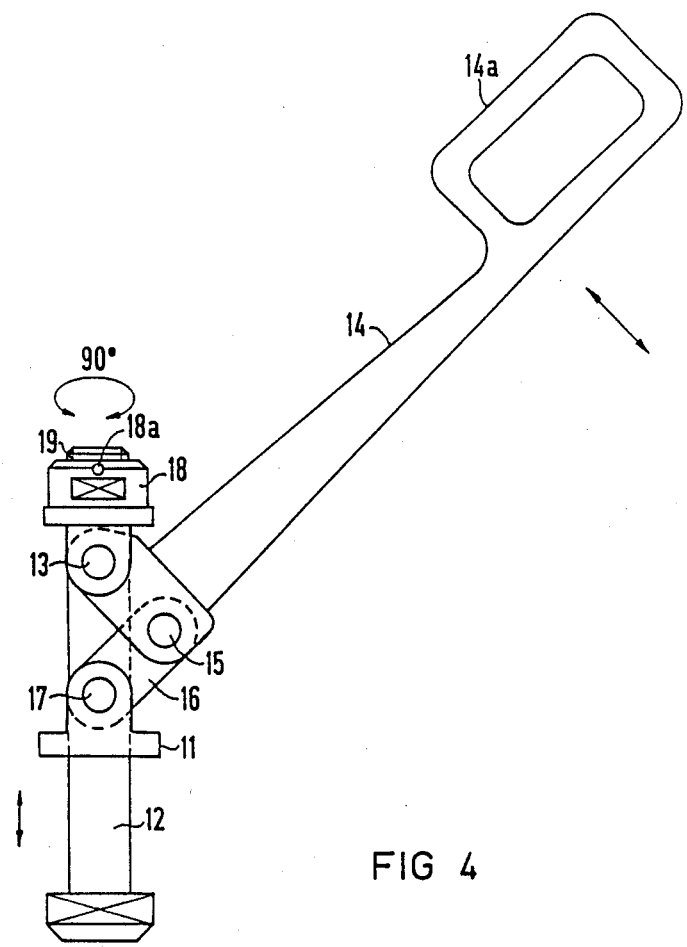
FIG. 4 illustrates the manner in which the seal face member and seat illustrated in FIG. 1 will distort when subjected to a temperature gradient.

As illustrated in FIG. 4, with the seat 10 and seal face member 14 of the conventional configuration described, thermal distortion of the sealing member will cause the sealing faces 13 and 16 to go out of parallel with consequent effects on the sealing efficiency. As faces 13 and 16 both rotate towards the service the effective thermal rotation rate will be the sum of the two, that is 2.1 seconds/° C.

By varying dimensions w, l, d and t the thermal rotation rate of the sealing face 13 of seat 10 may be made equal but opposite to the thermal rotation rate of the sealing face 16 of seal face member 14. If this is done, even though the faces 13 and 16 will rotate on thermal deformation of the seat 10 and seal face member 14, the faces will remain parallel to one another and the sealing efficiency will be unaffected.

Figure 5:
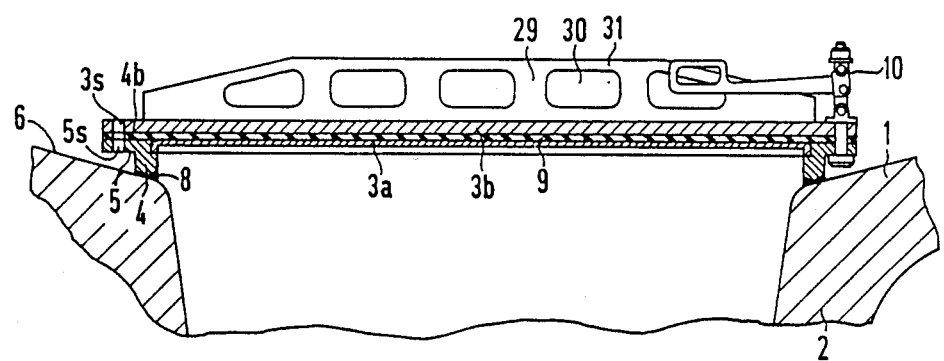
FIG. 5 illustrates the manner in which the seal face member and seat illustrated in FIG. 3 will distort when subjected to a temperature gradient.

For example, seat 18 illustrated in FIG. 3, has a nominal diameter of 95 mm and dimensions w=9 mm; l=13 mm; d=14.5 mm and t=6 mm. A recess 19 is provided round the periphery of flange portion 12 on the face thereof remote from the sealing face 13, the recess 19 being 4.5 mm wide and 6 mm deep. With this seat configuration, as illustrated by the isothermals, the average temperature of the bulk of material adjacent the sealing face 13 is lower than the average temperature of the bulk of material adjacent the axially opposite end of the seal 10. As a result of differential expansion axially across the seat 18, the sealing face 13 will rotate away from the service, that is in the opposite direction as face 16 of seal face member 14. With a seat 18 of the dimensions stated above, the thermal rotation rate at a heat transfer coefficient of 2,000 W/m$^2$K will be −1.30 seconds/° C. As this is equal but opposite to that of the seal face member 14 (ie +1.30 seconds/° C.) the faces 13 and 16 will remain parallel in spite of thermal deformation of the seat 18 and seal face member 14, as illustrated in FIG. 5. While the thermal rotation rate of the seal face member 14 and seat 18 may not remain constant over the operating range of heat transfer coefficients for which the seal is designed, rotation of faces 13 and 16 will be in opposite directions but substantially equal and the relative rotation between the faces will remain substantially zero.

Various modifications may be made without departing from the invention. For example, while in the embodiment illustrated in FIG. 3, the dimensions of the seat have been selected so that the thermal rotation rate of the sealing face of the seat matches that of the seal face member, both the seal face member and seat may be designed to give substantially zero thermal rotation.

I claim

1. A rotary mechanical face seal for producing a fluid tight seal between a pair of relatively rotatable components comprising a first seal face member fixed rotationally with respect to one of said components and a second seal face member fixed rotationally with respect to the other component, means being provided to urge opposing sealing faces of the first and second seal face members into engagement, said first seal face member being shaped and dimensioned to provide a thermal rotation rate substantially equal in magnitude but opposite in direction to that of the second seal face member, over the operating range of heat transfer coefficients to which the seal is subjected.

2. A mechanical face seal according to claim 1 in which one seal face member comprises a cylindrical portion with outwardly directed flange portion at its sealing face, the width and height of the flange portion and length and thickness of the cylindrical portion being selected to provide a seal face member of the required thermal rotation rate.

3. A rotary mechanical face seal according to claim 2 in which a recess is provided around the periphery of the flange portion in the face thereof remote from the sealing face.

* * * * *

UNITED STATES PATENT AND TRADEMARK OFFICE
CERTIFICATE OF CORRECTION

PATENT NO. : 4,850,599

DATED : Jul. 25, 1989

INVENTOR(S) : Amrat Parmar

It is certified that error appears in the above-identified patent and that said Letters Patent is hereby corrected as shown below:

The title page should be deleted to appear as per attached title page.

Figures 1-5 should be deleted to be replaced with Figs. 1-5 as shown on the attached sheet.

Signed and Sealed this

Twentieth Day of March, 1990

Attest:

JEFFREY M. SAMUELS

Attesting Officer

Acting Commissioner of Patents and Trademarks

United States Patent [19]
Parmar

[11] Patent Number: 4,850,599
[45] Date of Patent: Jul. 25, 1989

[54] MECHANICAL FACE SEALS

[75] Inventor: Amrat Parmar, Cambridge, England

[73] Assignee: Crane Packing Limited, England

[21] Appl. No.: 110,361

[22] Filed: Oct. 19, 1987

[30] Foreign Application Priority Data

Oct. 23, 1986 [GB] United Kingdom ............... 8625391

[51] Int. Cl.⁴ .................................................. F16J 9/00
[52] U.S. Cl. ........................................ 277/26; 277/96.1
[58] Field of Search ............... 277/22, 26, 236, 81 R, 277/96, 96.1

[56] References Cited

U.S. PATENT DOCUMENTS

| | | | |
|---|---|---|---|
| 3,718,335 | 2/1973 | Dernedde et al. | 277/26 |
| 4,103,907 | 8/1978 | Inouye et al. | 277/96.1 |
| 4,212,475 | 7/1980 | Sedy | 277/96.1 |
| 4,261,581 | 4/1981 | Hershey | 277/26 X |
| 4,643,437 | 2/1987 | Salant et al. | 277/81 R |
| 4,659,092 | 4/1987 | Wallace et al. | 277/96 X |

FOREIGN PATENT DOCUMENTS

| | | |
|---|---|---|
| 3423202 | 12/1985 | Fed. Rep. of Germany |
| 390642 | 4/1965 | Switzerland |
| 1555765 | 11/1979 | United Kingdom |

OTHER PUBLICATIONS

Soviet Inventions Illustrated, Section Mechanical, Week 8526, Aug. 1985, Abstract No. 158042 Q 65. Derwent Publications Ltd., London, GB; & SU-A-1129 442 (As Belo Nuclear Pow) 15-12-1984.

Primary Examiner—David Werner
Attorney, Agent, or Firm—Davis, Bujold & Streck

[57] ABSTRACT

A rotary mechanical face seal includes first and second seal face members, the sealing face of one seal face member being urged into engagement with the sealing face of the other seal face member, said seal face members being such that when subjected to temperature gradients due to the generation of heat at the sealing faces, the sealing faces will remain substantially parallel in spite of any thermal distortion of the seal face members.

3 Claims, 1 Drawing Sheet

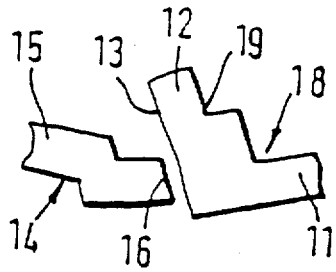

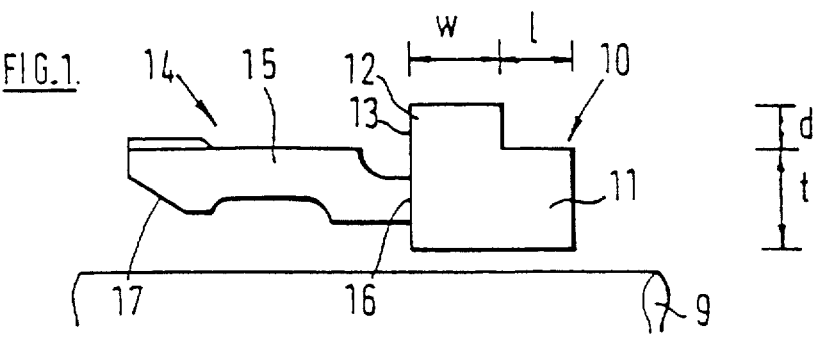
PRIOR ART FIG.1.
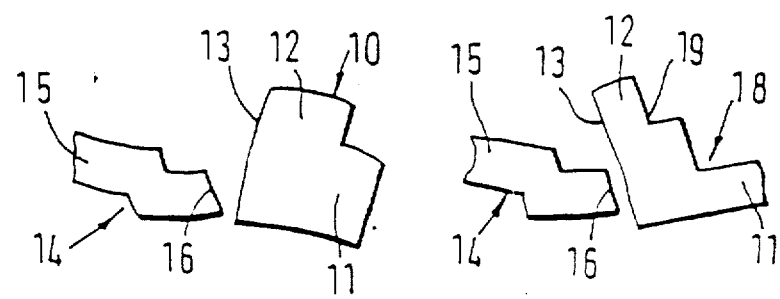
PRIOR ART FIG.4.   FIG.5.
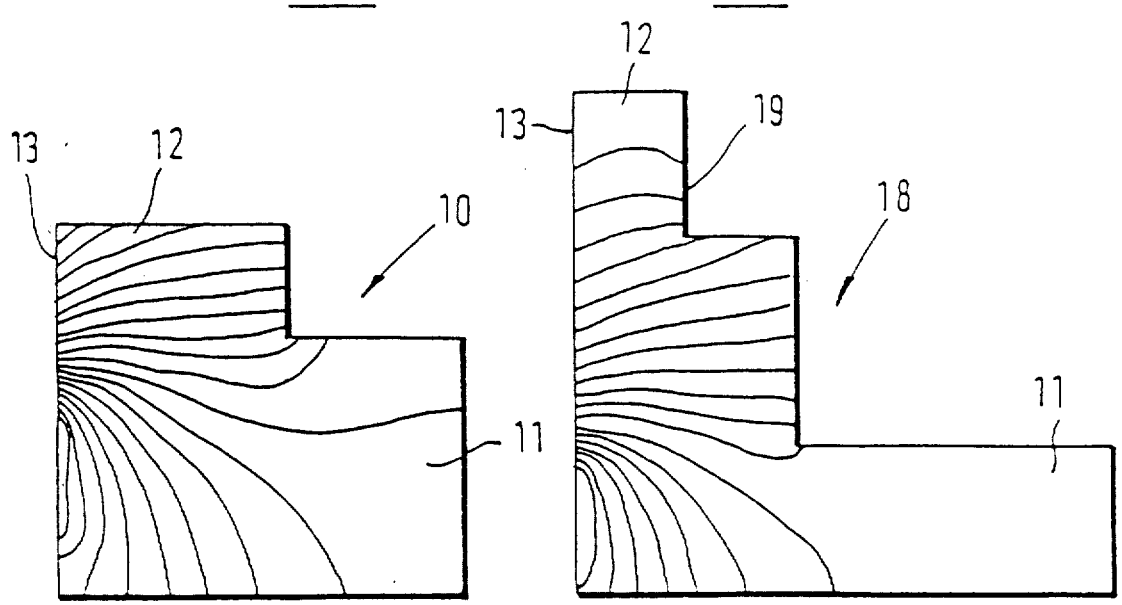
PRIOR ART FIG.2.   FIG.3.